United States Patent
Dellinger et al.

(10) Patent No.: US 12,027,737 B2
(45) Date of Patent: *Jul. 2, 2024

(54) FUEL CELLS INCORPORATING SILICA FIBERS

(71) Applicant: American Nano LLC., Clemmons, NC (US)

(72) Inventors: Mitch Dellinger, Clemmons, NC (US); Surya Raj Banks, Winston-Salem, NC (US)

(73) Assignee: American Nano LLC, Clemmons, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/196,524

(22) Filed: May 12, 2023

(65) Prior Publication Data

US 2023/0307681 A1 Sep. 28, 2023

Related U.S. Application Data

(63) Continuation of application No. 17/512,809, filed on Oct. 28, 2021, now Pat. No. 11,688,873, which is a continuation of application No. 16/578,915, filed on Sep. 23, 2019, now Pat. No. 11,189,853.

(60) Provisional application No. 62/735,419, filed on Sep. 24, 2018.

(51) Int. Cl.
*H01M 8/1097* (2016.01)
*H01M 8/1039* (2016.01)

(52) U.S. Cl.
CPC ....... *H01M 8/1097* (2013.01); *H01M 8/1039* (2013.01)

(58) Field of Classification Search
CPC .. H01M 4/8807; H01M 4/881; H01M 8/1039; H01M 8/1097; H01M 2008/1095
See application file for complete search history.

(56) References Cited

U.S. PATENT DOCUMENTS

| | | |
|---|---|---|
| 6,485,856 B1 | 11/2002 | Brown et al. |
| 2006/0003212 A1 | 1/2006 | Kim et al. |
| 2006/0154128 A1 | 7/2006 | Kim et al. |
| 2011/0143262 A1* | 6/2011 | Fultz ............ H01M 8/0239 429/513 |
| 2017/0222241 A1* | 8/2017 | Schweiss ............ H01M 4/8807 |
| 2020/0099079 A1 | 3/2020 | Dellinger et al. |

FOREIGN PATENT DOCUMENTS

JP 2012-064343 3/2012

OTHER PUBLICATIONS

Choi et al. "Silica Nanofibers from Electrospinning/Sol-Gel Process", Journal of Materials Science Letters, 22, (2003), pp. 891-893.*

(Continued)

*Primary Examiner* — Brittany L Raymond
(74) *Attorney, Agent, or Firm* — Morgan, Lewis & Bockius LLP

(57) ABSTRACT

Embodiments of the invention include fuel cells incorporating sheets and/or powders of silica fibers and methods for producing such devices. The silica fibers may be formed via electrospinning of a sol gel produced with a silicon alkoxide reagent, such as tetraethyl ortho silicate, alcohol solvent, and an acid catalyst.

23 Claims, 8 Drawing Sheets

(56) References Cited

OTHER PUBLICATIONS

English translation of JP Publication 2012-064343, Mar. 2012.
Junoh et al., "Polymer based Membrane Electrospun Fiber in Fuel Cell Application: A Short Review", Jurnal Teknologi (Sciences & Engineering), vol. 69, No. 9, (2014), pp. 77-81.
International Search Report and Written Opinion for International Application No. PCT/US2019-052384, dated Jan. 17, 2020, 16 pages.
Choi et al., "Silica Nanofiber from Electrospinning/Sol-Gel Process", Journal of Materials Science Letters, 22, (2003), pp. 891-893.

* cited by examiner

FUEL CELLS INCORPORATING SILICA FIBERS

RELATED APPLICATIONS

This application is a continuation of U.S. patent application Ser. No. 17/512,809, filed Oct. 28, 2021, which is a continuation of U.S. patent application Ser. No. 16/578,915, filed Sep. 23, 2019, which claims the benefit of and priority to U.S. Provisional Patent Application No. 62/735,419, filed Sep. 24, 2018, the entire disclosure of each of which is hereby incorporated herein by reference.

TECHNICAL FIELD

In various embodiments, the present invention relates to fuel cells incorporating silica fibers.

BACKGROUND

Fuel cell technology is of increasing interest due to its potential use as a high-efficiency, low-emission power source. Fuel cells are electrochemical devices that convert chemical energy stored in fuels such as hydrogen into electrical power. Thin, membrane-based fuel cells are receiving interest in applications such as portable power generation and fuel-cell vehicles. Various technologies for fuel cells have been proposed, but the implementation of such technologies has been hampered by poor reliability, low durability, or high cost. In addition, various fuel-cell technologies are based on exotic and expensive materials, which are frequently toxic, thereby establishing another barrier to adoption.

In contrast, silicon dioxide, i.e., silica, is one of the most abundant materials on Earth, being the major component of most types of sand. Silica has several advantageous properties that have resulted in its use in many different industries and products. For example, the high electrical resistance of silica has enabled its use as a high-performance insulator in microelectronic devices, e.g., as the gate-dielectric material in field-effect transistors. Silica is also utilized in the production of glass usable in many different applications. Optical fibers, for example, are fabricated utilizing silica and have enabled the formation and growth of worldwide optical telecommunications networks. Silica has also been utilized at the microscopic scale, as silica particles have been utilized as abrasive agents, as desiccants, and to form molds for investment casting of metallic materials. However, silica has yet to be utilized as a primary backbone material in fuel cells or similar devices. Utilization of silica may enable the fabrication of and use of fuel cells that are more friendly to the environment and that may be utilized to satisfy the requirements of next-generation power generation.

SUMMARY

In accordance with various embodiments of the present invention, mats of silica fibers, portions thereof, and/or powders fabricated therefrom, are utilized as or in the structural matrix for one or more components of a fuel cell. Various components of the fuel cell may incorporate other materials applied to and/or within the silica fibers in order to enable the desired conductivity or other properties of the fuel cell. The silica fibers themselves may be produced from a gelatinous material that is electrospun to form a fiber mat. The mat itself (or a portion thereof) may be utilized within the fuel cell, with or without additional processing (e.g., pressing and/or incorporation of an additive material). In various embodiments, the mat is fragmented into a powder or dust, which may include, consist essentially of, or consist of fibrous fragments. The powder, which may already incorporate one or more additive materials introduced before, during, or after the fiber electrospinning process, may be utilized in one or more regions of the fuel cells. In various embodiments, the powder is mixed with one or more additives for use in one or more fuel-cell regions. In other embodiments, the powder is pressed into a planar sheet and utilized within the fuel cell, with or without the incorporation of one or more additives.

In various embodiments, the silica fibers may be prepared by electrospinning a sol-gel, which may be prepared with a silicon alkoxide reagent, such as tetraethyl ortho silicate (TEOS), alcohol solvent, and an acid catalyst. In various embodiments, the sol-gel is produced via ripening of sol under controlled environmental conditions, and/or the properties of the sol or sol-gel during the ripening process are monitored, in order to identify various processing windows during which the electrospinning of the sol-gel may be successfully performed. As known in the art, a "sol" is a colloidal solution that gradually evolves towards the formation of a "gel," i.e., a diphasic system containing both a liquid phase and solid phase. Herein, the term "sol-gel" is used to refer to the gel produced from the sol-gel process that may be electrospun into fibers or a fibrous mat.

In various embodiments, the controlled environment for ripening the sol may involve controlled conditions in terms of humidity, temperature, and optionally barometric pressure. For example, the humidity may be controlled within the range of about 30% to about 90%, and the temperature may be controlled within the range of from about 50° F. to about 90° F. By controlling the environmental conditions during ripening, the gel may be electrospun during the time when spinning is optimal, which can occur in a very small window of only several minutes if the ripening process is accelerated by direct heat. When ripening the sol at a constant humidity in the range of about 50% to 80% and a temperature of about 60 to 80° F., the sol will ripen (gelatinize) in a few days, and the window for successful electrospinning may be expanded to at least several hours, and in some embodiments several days. The sol may therefore be ripened in an enclosure which may include one or more environmental monitors, such as a temperature reading device and/or a humidity reading device. Further, gases produced or released by the sol during the ripening process and/or relative weight of the sol may be monitored to determine a suitable or optimal time for electrospinning.

Once the sol is adequately ripened into a sol-gel, it is electrospun to form a mat of entangled silica fibers. Once electrospun, the silica fibers may have a variable diameter, such as in the range of from about 50 nm to 5 µm. In some embodiments, the fibers are predominately in the range of about 100 nm to about 2 µm, or predominately in the range of about 200 to about 1000 nm. For fabrication of various regions of the fuel cell, different materials may be applied to the silica fibers during and/or after the electrospinning process in order to imbue the resulting fibers, fiber mats, or powder with different properties. For example, carbon (e.g., in the form of carbon black, graphite, graphene, or carbon nanoparticles) and/or one or more other electrically conductive materials may be applied to the electrospun or electrospinning silica fibers in order to increase the electrical conductivity of the silica fiber mat; such fibers may be utilized in and/or fragmented into a powder for use in an electrode of a fuel cell. In addition, a reaction catalyst (e.g., platinum metal, one or more platinum-group metals, ruthenium, nickel, palladium, cerium oxide, or an alloy of platinum with one or more other metals such as cobalt, nickel, iron, vanadium, manganese, and/or chromium, etc.) may be applied to the silica fibers to enable the necessary reactivity of the fuel cell; such fibers may be used directly in the fuel cell or pressed into sheets or fragmented into a powder for use in the fuel cell. In various embodiments, additives or functional materials such as the electrically conductive material and/or the reaction catalyst may be incorporated into (e.g., mixed with) powder formed via fragmentation of the electrospun fibers.

In various embodiments, one or more additives or functional materials are added into the ripening sol (for example, in aqueous and/or solid/crystalline form) prior to electrospinning. For example, additive precursors such as nickel chloride, palladium chloride, and/or chloroplatinic acid may be added into the sol prior to electrospinning. During spinning, the additive(s) from the precursors (e.g., one or more metals) are incorporated into and/or on the electrospun fibers.

Fuel cells in accordance with embodiments of the invention may incorporate electrolyte layers that enable proton conduction through the fuel cell for generation of electricity. In various embodiments of the invention, the electrolyte layer may include, consist essentially of, or consist of a mat of silica fibers incorporating an additive that facilitates proton conduction through the electrolyte. For example, such electrolyte additives may include potassium hydroxide and/or phosphoric acid. In various embodiments, the electrolyte layer may include, consist essentially of, or consist of one or more polymeric layers that are typically porous to enable proton transfer. For example, pores in a polymeric layer may range in size from approximately 5 nm to approximately 100 nm. Such polymeric layers may include, consist essentially of, or consist of, for example, one or more polymeric materials such as polyethylene, polypropylene, polytetrafluoroethylene, polyvinyl chloride, and/or polymer blends including one or more of these with or without one or more other polymeric materials. The polymeric layer may include powder fabricated from silica fibers incorporated therein or thereon, and/or the polymeric layer may include one or more sheets of silica fibers incorporated thereon; as detailed herein, the silica fibers may have one or more functional materials incorporated therein. In an exemplary embodiment, the electrolyte layer includes, consists essentially of, or consists of a sheet or mat of silica fibers disposed (e.g., pressed) between two polymer layers. The electrolyte additive may be incorporated into the middle sheet or mat of silica fibers.

As utilized herein, a "sheet" of silica fibers refers to an electrospun mat of silica fibers, with or without additional pressing or processing, a pressed mat of silica fibers, or to a pressed layer of powder (e.g., fibrous fragments) formed via fragmentation of electrospun silica fiber mats. For example, one or more sheets of silica fibers may be utilized as or as a portion of an electrolyte layer, a catalyst layer, and/or a diffusion layer in fuel cells in accordance with embodiments of the present invention. In various embodiments, the incorporation of one or more sheets of silica fibers provides the fuel cell with protection from thermal decomposition and/or deformation, enhances mechanical integrity of the structure inside the fuel cell, and/or improves charge mobility within the fuel cell.

As utilized herein, in a region of a fuel cell "incorporating" an additive material such as one of the various materials listed above and herein (e.g., a conductive additive such as carbon and/or a catalyst additive) in or on the region (e.g., in or on the silica fibers and/or silica fiber powder), the additive material may be bonded to or otherwise adhered to in a substantially solid form to the fibers or powder particles, present within the crystalline structure of the fibers or powder particles themselves, and/or present within a mat or sheet (e.g., within pores or spaces between fibers) or within a collection of powder particles as a solid or in liquid form (e.g., with a liquid or solid binder or carrier such an organic liquid such as propylene carbonate and/or other organic polymers mentioned herein).

Various embodiments of the invention have advantageous properties when operating as fuel cells. For example, the layers of silica fibers have porosity that enables the efficient transport of fuel, oxygen, and reaction by-products through portions of the fuel cell while still providing sufficient conductivity for high performance. The porosity may also accommodate thermal cycles of the fuel cell while limiting deformation of the device. In addition, the silica fiber network utilized in the various layers of fuel cells in accordance with embodiments of the invention has a large surface area (e.g., ranging from approximately 50 $m^2$/gram to approximately 100 $m^2$/gram), thereby enabling a large reaction volume during device operation. The silica fiber networks are also advantageously thermally insulating and thus will thermally shield various layers of the fuel cell from extreme environmental conditions, thereby increasing the lifetime of the fuel cell. Moreover, fuel cells in accordance with embodiments of the present invention have a high moisture retention capability, to therefore preserve therewithin additives such as liquid electrolyte additives during operation. Fuel cells in accordance with embodiments of the invention may be advantageously utilized over a wide range of operating temperatures, as the silica fibers are non-reactive and have a high chemical stability. Fuel cells in accordance with embodiments of the invention may also be utilized at low levels of catalyst (e.g., metal catalyst) loading, making them extremely cost effective. Fuel cells in accordance with embodiments of the invention are also scalable and easily processed into many shapes and sizes.

In various embodiments of the invention, one or more regions or layers of the fuel cell include, consist essentially of, or consist of silica fiber powder (with or without an additive). For example, in various embodiments, once a silica fiber mat is successfully electrospun, it may be processed into a powder or dust. For example, the electrospun mat may be "fragmented," i.e., fractured, cut, ground, milled (e.g., in a ball mill or other milling device), pulverized, or otherwise divided into small fragments that maintain a fibrous structure. As used herein, the term "fibrous fragments" (or "fibrous-mat fragments," or simply "fragments") refers to small particles, parts, or flakes of a fibrous mat having an average dimension larger (e.g., 5×, 10×, or even 100×) than the width of at least some of the fibers of the mat. In various embodiments, the average size of a fibrous fragment is in the range of approximately 20 μm to approximately 200 μm. Fibrous fragments may thus resemble microscopic-scale versions of the electrospun mat itself e.g., intertwined collections of silica fibers, and thus typically are porous and have low densities. Thus, fibrous fragments may be contrasted with other types of micro-scale particles, such as the substantially spherical particles used in colloidal silica, which are each unitary, individual units or grains, rather than small collections of fibers. Various portions of a fibrous fragment (e.g., the edges) may have sharp and/or broken edges resulting from the fracturing process utilized to form the fragments from the electrospun mat. As utilized herein, the terms "silica fiber powder," "silica powder," "silica dust," and "fiber dust" include collections of particles generated via the fragmentation of electrospun fiber mats and/or fibers, and may include fibrous fragments and/or other powder particles resulting from such fragmentation.

Embodiments of the present invention may employ silica fibers, fragments thereof, and/or mixtures incorporating such fibers or fragments, and/or methods for fabricating such fibers or fragments detailed in U.S. patent application Ser. No. 15/934,599, filed on Mar. 23, 2018 (issued as U.S. Pat. No. 10,111,783), U.S. patent application Ser. No. 16/131,531, filed on Sep. 14, 2018, U.S. patent application Ser. No. 16/353,181, filed on Mar. 14, 2019, and U.S. patent application Ser. No. 16/367,313, filed on Mar. 28, 2019, the entire disclosure of each of which is incorporated by reference herein.

In an aspect, embodiments of the invention feature a method of fabricating a fuel cell. A first sheet of silica fibers is formed at least in part by electrospinning a sol-gel. An electrolyte layer is formed at least in part by, after and/or during the electrospinning, incorporating a first functional material onto the first sheet of silica fibers. The electrolyte layer may be configured to conduct protons therethrough. The electrolyte layer may be configured to conduct protons therethrough while preventing the conduction of electrons therethrough. A first catalyst layer is disposed on an anode side of the electrolyte layer. The first catalyst layer may be configured to receive a hydrogen-containing fuel, oxidize hydrogen from the fuel, and supply protons to the electrolyte layer. A second catalyst layer is disposed on a cathode side of the electrolyte layer. The anode side and the cathode side may be on opposite sides of the electrolyte layer. The second catalyst layer may be configured to receive protons from the electrolyte layer, receive oxygen, and reduce the oxygen to form water to thereby enable the production of electrical current by the fuel cell.

Embodiments of the invention may include one or more of the following in any of a variety of combinations. The first catalyst layer and/or the second catalyst layer may include, consist essentially of, or consist of a support layer incorporating a catalyst material. The catalyst material may include, consist essentially of, or consist of platinum, one or more platinum-group metals, nickel, ruthenium, palladium, cerium oxide, and/or an alloy of platinum with one or more other metals. The support layer may include, consist essentially of, or consist of a sheet of silica fibers. The support layer may include, consist essentially of, or consist of carbon or a carbon-containing material. The first catalyst layer may include, consist essentially of, or consist of a second sheet of silica fibers. The first catalyst layer may be provided at least in part by electrospinning a second sol-gel. One or more catalyst materials, or precursors thereof, may be incorporated into the second sol-gel prior to electrospinning thereof. The second sheet of silica fibers may include the one or more catalyst materials incorporated therein and/or thereon. The second catalyst layer may include, consist essentially of, or consist of a third sheet of silica fibers. The second catalyst layer may be provided at least in part by electrospinning a third sol-gel. One or more catalyst materials, or precursors thereof, may be incorporated into the third sol-gel prior to electrospinning thereof. The third sheet of silica fibers may include the one or more catalyst materials incorporated therein and/or thereon. Two or more of the sol-gel, the second sol-gel, and the third sol-gel may have substantially the same composition. Two or more of the sol-gel, the second sol-gel, and the third sol-gel may have different compositions.

A first diffusion layer may be disposed on the first catalyst layer opposite the electrolyte layer. The first diffusion layer may be configured to transport the hydrogen-containing fuel to the first catalyst layer. A second diffusion layer may be disposed on the second catalyst layer opposite the electrolyte layer. The second diffusion layer may be configured to transport oxygen to the second catalyst layer. The first diffusion layer may include, consist essentially of, or consist of a second sheet of silica fibers. The first diffusion layer may be provided at least in part by electrospinning a second sol-gel. The second diffusion layer may include, consist essentially of, or consist of a third sheet of silica fibers. The second diffusion layer may be provided at least in part by electrospinning a third sol-gel. The first functional material may include, consist essentially of, or consist of a fluoropolymer, potassium hydroxide, and/or phosphoric acid.

The sol-gel may be prepared with tetraethylorthosilicate (TEOS). Prior to electrospinning the sol-gel, the sol-gel may be produced from an initial sol containing 75% to 90% TEOS, 8% to 25% ethanol, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning (or ripening) the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 10 days, and for 2 days to 7 days in some embodiments. The sol-gel may be electrospun when the weight is at from 10% to 60% of the starting weight of the initial sol or sol-gel before ripening (transitioning). The sol-gel may be electrospun when the weight is at from 10% to 40% of the starting weight of the initial sol or sol-gel before ripening (transitioning). The sol-gel may be electrospun when the weight is at from 20% to 40% of the starting weight of the initial sol or sol-gel before ripening (transitioning). The sol-gel may be electrospun when the production of ethylene vapor is 10% to 20% relative to the peak production of ethylene vapors during ripening (transitioning) of the initial sol or sol-gel before ripening. The sol-gel may be electrospun when the production of ethylene vapor therefrom is 10% to 40% relative to the initial sol or sol-gel before ripening (transitioning).

Forming the electrolyte layer may include disposing the first sheet of silica fibers adjacent to, proximate, and/or in contact with one or more non-silica membranes. Forming the electrolyte layer may include disposing the first sheet of silica fibers between two non-silica membranes. The first sheet of silica fibers may be in direct contact with the two non-silica membranes. The two non-silica membranes may include, consist essentially of, or consist of the same material or different materials. The one or more non-silica membranes may include, consist essentially of, or consist of a polymeric material. Embodiments of the invention include fuel cells fabricated in accordance with any of the methods described above.

In another aspect, embodiments of the invention feature a method of fabricating a fuel cell. An electrolyte layer is provided. The electrolyte layer may be configured to conduct protons therethrough. The electrolyte layer may be configured to conduct protons therethrough while preventing the conduction of electrons therethrough. A first catalyst layer is provided. The first catalyst layer may be configured to receive a hydrogen-containing fuel, oxidize hydrogen from the fuel, and supply protons to the electrolyte layer. A second catalyst layer is provided. The second catalyst layer may be configured to receive protons from the electrolyte layer, receive oxygen, and reduce the oxygen to form water to thereby enable the production of electrical current by the fuel cell. The first catalyst layer may be disposed on an anode side of the electrolyte layer. The second catalyst layer may be disposed on a cathode side of the electrolyte layer. The anode side and the cathode side may be opposite sides of the electrolyte layer. The first catalyst layer may include, consist essentially of, or consist of a first sheet of silica fibers. The first catalyst layer may be provided at least in part by electrospinning a first sol-gel. The second catalyst layer may include, consist essentially of, or consist of a second sheet of silica fibers. The second catalyst layer may be provided at least in part by electrospinning a second sol-gel.

Embodiments of the invention may include one or more of the following in any of a variety of combinations. The first catalyst layer and/or the second catalyst layer may incorporate a catalyst material. The catalyst material may include, consist essentially of, or consist of platinum, one or more platinum-group metals, nickel, ruthenium, palladium, cerium oxide, and/or an alloy of platinum with one or more other metals. Providing the first catalyst layer may include, after and/or during the electrospinning, incorporating a catalyst material onto the first sheet of silica fibers. Providing the second catalyst layer may include, after and/or during the electrospinning, incorporating a catalyst material onto the second sheet of silica fibers. One or more catalyst materials, or precursors thereof (e.g., solutions, salts, and/or compounds containing the catalyst materials), may be incorporated into the first sol-gel prior to electrospinning thereof. The first sheet of silica fibers may include the one or more catalyst materials incorporated therein and/or thereon. One or more catalyst materials, or precursors thereof (e.g., solutions, salts, and/or compounds containing the catalyst materials), may be incorporated into the second sol-gel prior to electrospinning thereof. The second sheet of silica fibers may include the one or more catalyst materials incorporated therein and/or thereon. The electrolyte layer may include, consist essentially of, or consist of a non-silica membrane, a polymer material, a fluoropolymer, potassium hydroxide, and/or phosphoric acid.

A first diffusion layer may be disposed on the first catalyst layer opposite the electrolyte layer. The first diffusion layer may be configured to transport the hydrogen-containing fuel to the first catalyst layer. A second diffusion layer may be disposed on the second catalyst layer opposite the electrolyte layer. The second diffusion layer may be configured to transport oxygen to the second catalyst layer. The first diffusion layer may include, consist essentially of, or consist of a third sheet of silica fibers. The first diffusion layer may be provided at least in part by electrospinning a third sol-gel. The second diffusion layer may include, consist essentially of, or consist of a fourth sheet of silica fibers. The second diffusion layer may be provided at least in part by electrospinning a fourth sol-gel. Two or more of the sol-gel, the second sol-gel, the third sol-gel, and the fourth sol-gel may have substantially the same composition. Two or more of the sol-gel, the second sol-gel, the third sol-gel, and the fourth sol-gel may have different compositions.

For one or more of the sol-gels mentioned above, the sol-gel may be prepared with tetraethylorthosilicate (TEOS). Prior to electrospinning the sol-gel, the sol-gel may be produced from an initial sol containing 75% to 90% TEOS, 8% to 25% ethanol, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning (or ripening) the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 10 days, and for 2 days to 7 days in some embodiments. The sol-gel may be electrospun when the weight is at from 10% to 60% of the starting weight of the initial sol or sol-gel before ripening (transitioning). The sol-gel may be electrospun when the weight is at from 10% to 40% of the starting weight of the initial sol or sol-gel before ripening (transitioning). The sol-gel may be electrospun when the weight is at from 20% to 40% of the starting weight of the initial sol or sol-gel before ripening (transitioning). The sol-gel may be electrospun when the production of ethylene vapor is 10% to 20% relative to the peak production of ethylene vapors during ripening (transitioning) of the initial sol or sol-gel before ripening. The sol-gel may be electrospun when the production of ethylene vapor therefrom is 10% to 40% relative to the initial sol or sol-gel before ripening (transitioning). Embodiments of the invention include fuel cells fabricated in accordance with any of the methods described above.

In yet another aspect, embodiments of the invention feature a fuel cell including, consisting essentially of, or consisting of an electrolyte layer, a first catalyst layer disposed on an anode side of the electrolyte layer, and a second catalyst layer disposed on a cathode side of the electrolyte layer. The electrolyte layer includes, consists essentially of, or consists of a first sheet of silica fibers. The electrolyte layer may have a first functional material incorporated within the first sheet of silica fibers. The first catalyst layer may be configured to receive a hydrogen-containing fuel, oxidize hydrogen from the fuel, and supply protons to the electrolyte layer. The second catalyst layer may be configured to receive protons from the electrolyte layer, receive oxygen, and reduce the oxygen to form water to thereby enable the production of electrical current by the fuel cell.

Embodiments of the invention may include one or more of the following in any of a variety of combinations. The first catalyst layer and/or the second catalyst layer may include, consist essentially of, or consist of a support layer incorporating a catalyst material. The catalyst material may include, consist essentially of, or consist of platinum, one or more platinum-group metals, nickel, ruthenium, palladium, cerium oxide, and/or an alloy of platinum with one or more other metals. The support layer may include, consist essentially of, or consist of a second sheet of silica fibers and/or carbon or a carbon-containing material. The first catalyst layer may include, consist essentially of, or consist of a second sheet of silica fibers incorporating a first catalyst material. The second catalyst layer may include, consist essentially of, or consist of a third sheet of silica fibers incorporating a second catalyst material. The first catalyst material and/or the second catalyst material may include, consist essentially of, or consist of platinum, one or more platinum-group metals, nickel, ruthenium, palladium, cerium oxide, and/or an alloy of platinum with one or more other metals. A first diffusion layer may be disposed on the first catalyst layer opposite the electrolyte layer. The first diffusion layer may be configured to transport the hydrogen-containing fuel to the first catalyst layer. A second diffusion layer may be disposed on the second catalyst layer opposite the electrolyte layer. The second diffusion layer may be configured to transport oxygen to the second catalyst layer. The first diffusion layer may include, consist essentially of, or consist of a second sheet of silica fibers. The second diffusion layer may include, consist essentially of, or consist of a third sheet of silica fibers.

The first functional material may include, consist essentially of, or consist of a polymer material, a fluoropolymer, potassium hydroxide, and/or phosphoric acid. The electrolyte layer may include one or more non-silica membranes adjacent to, proximate, and/or in contact with the first sheet of silica fibers. The electrolyte layer may include two non-silica membranes sandwiching the first sheet of silica fibers therebetween. The one or more non-silica membranes may include, consist essentially of, or consist of a polymeric material.

The first sheet of silica fibers may be formed at least in part by electrospinning a sol-gel. The sol-gel may be prepared with tetraethylorthosilicate (TEOS). Prior to electrospinning the sol-gel, the sol-gel may be produced from an initial sol containing 75% to 90% TEOS, 8% to 25% ethanol, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning (or ripening) the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 10 days, and for 2 days to 7 days in some embodiments. The sol-gel may be electrospun when the weight is at from 10% to 60% of the starting weight of the initial sol or sol-gel before ripening (transitioning). The sol-gel may be electrospun when the weight is at from 10% to 40% of the starting weight of the initial sol or sol-gel before ripening (transitioning). The sol-gel may be electrospun when the weight is at from 20% to 40% of the starting weight of the initial sol or sol-gel before ripening (transitioning). The sol-gel may be electrospun when the production of ethylene vapor is 10% to 20% relative to the peak production of ethylene vapors during ripening (transitioning) of the initial sol or sol-gel before ripening. The sol-gel may be electrospun when the production of ethylene vapor therefrom is 10% to 40% relative to the initial sol or sol-gel before ripening (transitioning).

In another aspect, embodiments of the invention feature a fuel cell including, consisting essentially of, or consisting of an electrolyte layer, a first catalyst layer disposed on an anode side of the electrolyte layer, and a second catalyst layer disposed on a cathode side of the electrolyte layer. The first catalyst layer may be configured to receive a hydrogen-containing fuel, oxidize hydrogen from the fuel, and supply protons to the electrolyte layer. The second catalyst layer may be configured to receive protons from the electrolyte layer, receive oxygen, and reduce the oxygen to form water to thereby enable the production of electrical current by the fuel cell. The first catalyst layer includes, consists essentially of, or consists of a first sheet of silica fibers incorporating a first catalyst material, and/or the second catalyst layer includes, consists essentially of, or consists of a second sheet of silica fibers incorporating a second catalyst material.

Embodiments of the invention may include one or more of the following in any of a variety of combinations. The electrolyte layer may include, consist essentially of, or consist of a non-silica membrane, a polymer material, a fluoropolymer, potassium hydroxide, and/or phosphoric acid. The first catalyst material and/or the second catalyst material may include, consist essentially of, or consist of platinum, one or more platinum-group metals, nickel, ruthenium, palladium, cerium oxide, and/or an alloy of platinum with one or more other metals. A first diffusion layer may be disposed on the first catalyst layer opposite the electrolyte layer. The first diffusion layer may be configured to transport the hydrogen-containing fuel to the first catalyst layer. A second diffusion layer may be disposed on the second catalyst layer opposite the electrolyte layer. The second diffusion layer may be configured to transport oxygen to the second catalyst layer. The first diffusion layer may include, consist essentially of, or consist of a third sheet of silica fibers. The second diffusion layer may include, consist essentially of, or consist of a fourth sheet of silica fibers.

The first sheet of silica fibers and/or the second sheet of silica fibers may be formed at least in part by electrospinning a sol-gel. The sol-gel may be prepared with tetraethyl orthosilicate (TEOS). Prior to electrospinning the sol-gel, the sol-gel may be produced from an initial sol containing 75% to 90% TEOS, 8% to 25% ethanol, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning (or ripening) the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 10 days, and for 2 days to 7 days in some embodiments. The sol-gel may be electrospun when the weight is at from 10% to 60% of the starting weight of the initial sol or sol-gel before ripening (transitioning). The sol-gel may be electrospun when the weight is at from 10% to 40% of the starting weight of the initial sol or sol-gel before ripening (transitioning). The sol-gel may be electrospun when the weight is at from 20% to 40% of the starting weight of the initial sol or sol-gel before ripening (transitioning). The sol-gel may be electrospun when the production of ethylene vapor is 10% to 20% relative to the peak production of ethylene vapors during ripening (transitioning) of the initial sol or sol-gel before ripening. The sol-gel may be electrospun when the production of ethylene vapor therefrom is 10% 70 to 40% relative to the initial sol or sol-gel before ripening (transitioning).

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately," "about," and "substantially" mean±10%, and in some embodiments, ±5%. The term "consists essentially of" means excluding other materials that contribute to function, unless otherwise defined herein. Nonetheless, such other materials may be present, collectively or individually, in trace amounts. Unless otherwise indicated, fuel cells, materials, mixtures, regions, and other structures described herein may incorporate unintentional impurities.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
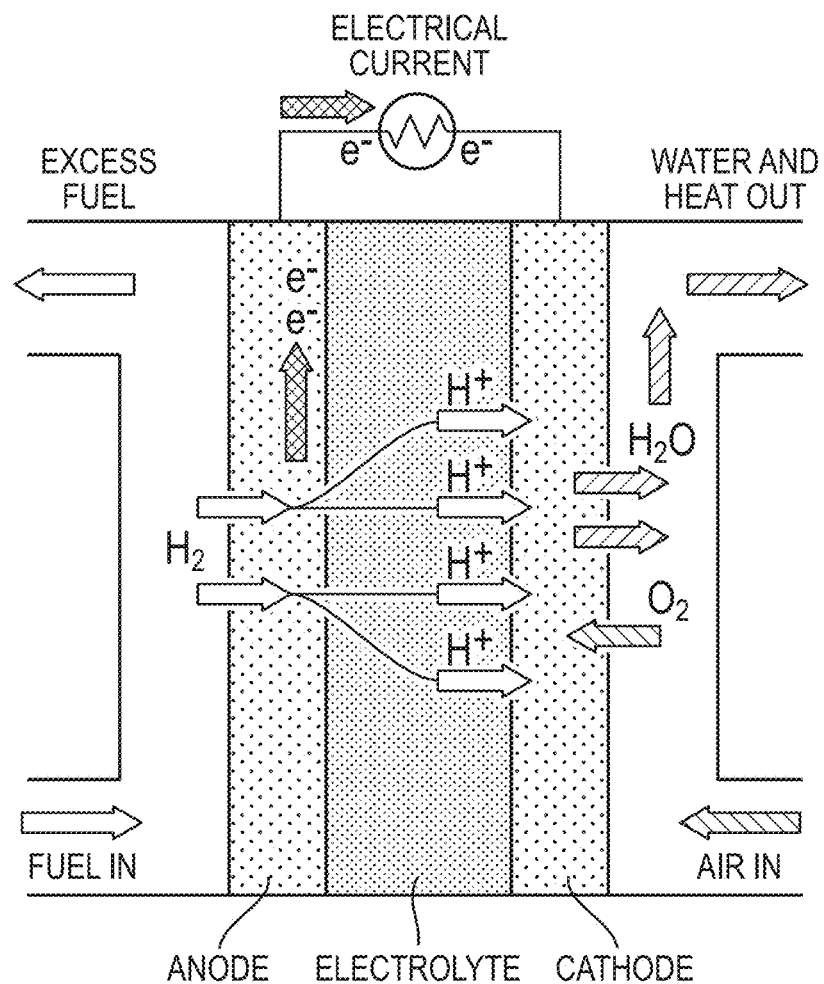
FIG. 1A is a cross-sectional schematic of a fuel cell in accordance with embodiments of the present invention.

In accordance with various embodiments of the present invention, silica fibers and/or powder formed therefrom are utilized as the structural matrix (or at least a portion thereof) for various components of a fuel cell. Various components of the fuel cell incorporate other materials mixed with, applied to, and/or incorporated within the silica fibers in order to enable the functionality of the fuel cell. The silica fibers themselves may be produced from a gelatinous material that is electrospun to form a fiber mat. The mat itself (or a portion thereof) may be utilized within the fuel cell, with or without additional processing (e.g., pressing and/or incorporation of an additive material). In various embodiments, the mat is fragmented into a powder or dust, which may include, consist essentially of, or consist of fibrous fragments. The powder, which may already incorporate one or more additive materials introduced before, during, or after the fiber electrospinning process, may be utilized in one or more regions of the fuel cell. In various embodiments, the powder is mixed with one or more additives for use in one or more fuel-cell regions. In other embodiments, the powder is pressed into a planar sheet and utilized within the fuel cell, with or without the incorporation of one or more additives.

In some embodiments, silica fibers and/or fiber mats are electrospun from a gelatinous material. For example, the silica fibers and/or fiber mats may be prepared by electrospinning a sol-gel, which may be prepared with a silicon alkoxide reagent, such as tetraethyl ortho silicate (TEOS), alcohol solvent, and an acid catalyst.

In some embodiments, the sol-gel for preparing the silica fiber composition is prepared by a method that includes preparing a first mixture containing an alcohol solvent, a silicon alkoxide reagent such as tetraethylorthosilicate (TEOS); preparing a second mixture containing an alcohol solvent, water, and an acid catalyst; fully titrating the second mixture into the first mixture; and processing (ripening) the combined mixture to form a gel for electrospinning. In some embodiments, the silicon alkoxide reagent is TEOS. Alternative silicon alkoxide reagents include those with the formula $Si(OR)_4$, where R is from 1 to 6, and preferably 1, 2, or 3.

In some embodiments, the sol comprises, consists essentially of, or consists of about 70% to about 90% by weight silicon alkoxide (e.g., TEOS), about 5% to about 25% by weight alcohol solvent (e.g., anhydrous ethanol), an acid catalyst (e.g., less than about 0.1% by weight when using HCl) and water. Any sol or sol-gel described herein may include the balance water (i.e., water may constitute any amount of the sol or sol-gel that is otherwise unspecified). Any sol or sol-gel described herein may optionally contain one or more reagents or additives that may or do alter one or more properties of the sol, the sol-gel, and/or the silica fibers (and/or powder prepared therefrom). Such reagents may include, but are not limited to, for example, polymers and polymeric solutions, inert reagents, alcohols, organic and/or aqueous solvents, organic salts, inorganic salts, metals, metal oxides, metal nitrides, metal oxynitrides, carbon e.g., graphene, graphite, amorphous carbon, fullerenes, etc.), etc.

In some embodiments, the sol contains 70% to 90% tetraethyl orthosilicate (TEOS) by weight, 8% to 25% ethanol by weight, 1% to 10% water by weight, and an acid catalyst. In some embodiments, the sol contains 75% to 85% by weight TEOS, 12% to 20% by weight ethanol, and about 2% to 5% by weight water. An exemplary sol contains about 80% by weight TEOS, about 17% by weight ethanol, and about 3% by weight water. In some embodiments, the acid catalyst is MCl. For example, the sol may contain less than about 0.1% HCl by weight. For example, the sol may contain from 0.02% to 0.08% MCl by weight. In various embodiments, the sol does not contain an organic polymer, or other substantial reagents, such that the fiber composition will be substantially pure $SiO_2$. In various embodiments, the sol does not include inorganic salts (e.g., sodium chloride, lithium chloride, potassium chloride, magnesium chloride, calcium chloride, and/or barium chloride), nor are, in various embodiments, inorganic salts mixed with other components of the sol or into the sol itself. In various embodiments, the fiber composition does not include metals or metal oxides (e.g., $TiO_2$ or $ZrO_2$). In various embodiments, the fiber composition consists essentially of Sift, i.e., contains only Sift and unintentional impurities, and, in some embodiments, species and/or complexes resulting from the incomplete conversion of the sol to Sift (e.g., water and/or chemical groups such as ethoxy groups, silanol groups, hydroxyl groups, etc.). In various embodiments, additives may be incorporated onto silica fibers and or powder prepared therefrom after the electrospinning process.

In some embodiments, the alcohol solvent is an anhydrous denatured ethanol, or in some embodiments, methanol, propanol, butanol or any other suitable alcohol solvent. The first mixture may be agitated, for example, using a magnetic stirrer, vibration platform or table, or other agitation means. The second mixture contains an alcohol solvent, water, and an acid catalyst. The alcohol solvent may be an anhydrous denatured alcohol, or may be methanol, propanol, butanol or any other suitably provided alcohol solvent. Water may be distilled water or deionized water. Enough acid catalyst is added to the mixture to aid in the reaction. This acid catalyst may be hydrochloric acid, or may be sulfuric acid or other suitable acid catalyst. The second mixture may be agitated, for example, magnetic stirrer, vibration platform or table, or other agitation means. In some embodiments, the first mixture (or sol) and the second mixture (or sol) are created without the use of direct heat (i.e., heat applied via extrinsic means such as a hot plate or other heat source).

According to various embodiments, the first mixture and the second mixture are combined by dripping or titrating the second mixture into the first mixture, preferably with agitation. The combined mixture is then further processed by allowing the sol to ripen in a controlled environment until a substantial portion of the alcohol solvent has evaporated to create a sol-gel suitable for electrospinning. For example, the controlled environment may include an enclosure with at least one vent and optionally a fan to draw gases away from the mixture, and which may involve controlled conditions in terms of humidity, temperature, and optionally barometric pressure. For example, the humidity may be controlled (e.g., via use of conventional humidifiers and/or dehumidifiers) within the range of about 30% to about 90%, such as from about 40% to about 80%, or in some embodiments, from about 50% to about 80%, or from about 50% to about 70% (e.g., about 55%, or about 60%, or about 65%). Some humidity may be helpful to slow evaporation of solvent, and thereby lengthen the window for successful electrospinning. In some embodiments, the temperature is in the range of from about 50° F. to about 90° F., such as from about 60° F. to about 80° F., or from about 65° F. to about 75° F. In various embodiments, the sol is not exposed to heat over 150° F. or heat over 100° F., so as to avoid accelerating the transition. In some embodiments, barometric pressure is optionally, controlled (e.g., using a low pressure vacuum source such as a pump or a fan). By controlling the environmental conditions during ripening, the time period during which the gel may be electrospun may be lengthened; this time period may be a small window of only several minutes if the ripening process is too accelerated, such as with direct heat. When ripening the sol at a constant humidity of about 55% and temperature of about 72° F., the sol will ripen (gelatinize) in a few days, and the window for successful electrospinning may be expanded to at least several hours, and in some embodiments several days. In various embodiments, the ripening process takes at least 2 days, or at least 3 days in some embodiments. However, in various embodiments the ripening does not take more than 10 days, or more than 7 days. In some embodiments, the ripening process takes from 2 to 10 days, or from 2 to 7 days, or from 2 to 5 days, or from 2 to 4 days (e.g., about 2, about 3, or about 4 days). In various embodiments, the sol-gel is spinnable well before it transitions into a more solidified, non-flowable mass.

The enclosure space for ripening the sol-gel may include a vent on at least one surface for exhausting gases from within the enclosure, and optionally the vent may include a fan for exhausting gases produced during the ripening process. The enclosure space may optionally include a heating source (e.g., one or more heating elements, for example resistive heating elements) for providing a nominal amount of heat within the enclosure space, to maintain a preferred temperature. In some embodiments, a source of humidity (e.g., an open container of water or other aqueous, water-based liquid) is provided within the enclosure environment to adjust the humidity to a desired range or value. The enclosure may further include one or more environmental monitors, such as a temperature reading device (e.g., a thermometer, thermocouple, or other temperature sensor) and/or a humidity reading device (e.g., a hygrometer or other humidity sensor).

In some embodiments, the sol-gel is electrospun after a ripening process of at least 2 days, or at least 36 hours, or at least 3 days, or at least 4 days, or at least 5 days at the controlled environmental conditions (but in various embodiments, not more than 10 days or not more than 7 days under the controlled environmental conditions). By slowing the ripening process, the ideal time to spin the fibers can be identified. The weight of the sol-gel may be used as an indicator of when the sol-gel is at or near the ideal time to electrospin. Without intending to be bound by theory, it is believed that the viscosity of the sol-gel is a poor determinant for identifying the optimal time for electrospinning. For example, in various embodiments, the sol-gel is from about 10% to about 60% of the original weight of the sol (based on loss of alcohol solvent during transitioning). In some embodiments, the sol-gel is from 15 to 50% of the original weight of the sol, or in the range of about 20 to about 40% of the original weight of the sol.

In some embodiments, the sol-gel is ripened for at least 2 days, or at least 36 hours, or at least 3 days, or at least 4 days, or at least 5 days, and is electrospun when the ethylene vapors produced by the composition are between about 10% and about 40% of the vapors produced by the starting sol, such as in the range of about 10% and about 25%, or in the range of about 10% to about 20%. Ethylene is a colorless flammable gas with a faint sweet and musky odor (which is clearly evident as solvent evaporation slows). Ethylene is produced by the reaction of ethanol and acid. Ethylene may optionally be monitored in the vapors using a conventional ethylene monitor. In other embodiments, gases produced by the sol during the sol ripening process are monitored to determine a suitable or optimal time for electrospinning. Gas profiles may be monitored using gas chromatography.

In various embodiments, additives such as conductive materials and/or catalyst additives (and/or precursors (e.g., salts) thereof and/or containing the additives) may be introduced into the sol-gel prior to electrospinning, and such additives may therefore be incorporated into and/or onto the spun fibers. In various embodiments, the additive is introduced into the sol-gel immediately prior to (e.g., less than 0.5 hour before, less than 1 hour before, less than 2 hours before, or less than 5 hours before) electrospinning so that the sol-gel successfully ripens prior to introduction of the additive, facilitating successfully el ectrospinning. In various embodiments, the additive may be introduced into the sol-gel after it has ripened for at least 0.5 days, at least 1 day, at least 2 days, or at least 3 days.

In various embodiments, the sol-gel may be ripened for a shorter period of time, as long as the sol-gel remains spinnable via electrospinning. The resulting silica fiber mat or collection of fibers may in some cases be more brittle after ripening for a shorter time period, but such brittleness may not prevent the fragmenting of the fibers and production of powder therefrom. In various embodiments, silica fiber powder utilized in one or more regions of the fuel cell may be produced from silica fibers or fiber mats electrospun after ripening for less time than silica fibers or mats utilized within the battery in mat or sheet form. For example, silica fiber powder utilized in one or more regions of the fuel cell may be produced from silica fibers or fiber mats electrospun after ripening for less than 2 days or less than 1 day.

The processing of the sol-gel mixture may require stirring or other agitation of the mixtures at various intervals or continuously due to the development of silicone dioxide crystalline material on the top surface of the mixtures. This development of crystalline material on the top surface slows the processing time and it is believed that the crystalline material seals off exposure of the mixture to the gaseous vacuum provided within the enclosure space. In some embodiments, any solid crystalline material is removed from the mixture.

Upon completion of the sol-gel process, the sol-gel is then electrospun using any known technique. The sol or sot-gel may be preserved (e.g., frozen or refrigerated) if needed (and such time generally will not apply to the time for ripening). An exemplary process for electrospinning the sol-gel is described in Choi, Sung-Seen, et al., Silica nanofibers from el ectrospinning/sol-gel process, *Journal of Materials Science Letters* 22, 2003, 891-893, which is hereby incorporated by reference in its entirety. Exemplary, processes for electrospinning are further disclosed in U.S. Pat. No. 8,088,965, which is hereby incorporated by reference in its entirety.

In an exemplary electrospinning technique, the sol-gel is placed into one or more syringe pumps that are fluidly coupled to one or more spinnerets. The spinnerets are connected to a high-voltage (e.g., 5 kV to 50 kV) source and are external to and face toward a grounded collector drum. The drum rotates during spinning, typically along an axis of rotation approximately perpendicular to the spinning direction extending from the spinnerets to the drum. As the sol-gel is supplied to the spinnerets from the syringe pumps (or other holding tank), the high voltage between the spinnerets and the drum forms charged liquid jets that are deposited on the drum as small entangled fibers. As the drum rotates and electrospinning continues, a fibrous mat of silica fibers is formed around the circumference of the drum. In various embodiments, the spinnerets and syringe pump(s) may be disposed on a movable platform that is movable parallel to the length of the drum. In this manner, the length along the drum of the resulting fiber mat may be increased without increasing the number of spinnerets. The diameter of the drum may also be increased to increase the areal size of the electrospun mat. The thickness of the mat may be largely dependent upon the amount of sol-gel used for spinning and thus the amount of electrospinning time. For example, the mat may have a thickness of greater than about ⅛ inch, or greater than about ¼ inch, or greater than about ⅓ inch, or greater than about ½ inch.

After completion of the electrospinning process, the resulting mat is removed from the drum. For example, the mat may be cut and peeled away from the drum in one or more pieces. The mat may then be fragmented to form a powder. In various embodiments, the powder includes, consists essentially of, or consists of small fibrous fragments that are each intertwined collections of silica fibers, rather than unitary solid particles. In some embodiments, the electrospun mat may be fractured, cut, ground, milled, or otherwise divided into small fragments that maintain a fibrous structure. In some embodiments, the mat (or one or more portions thereof) is rubbed through one or more screens or sieves, and the mesh size of the screen determines, at least in part, the size of the resulting fibrous fragments or powder or dust produced from the electrospun mat. For example, the mat or mat portions may be rubbed through a succession of two or more screens having decreasing mesh sizes (e.g., screens having mesh numbers of 100, 200, 300, or even 400), in order to produce a powder or dust or collection of fibrous fragments having the desired sizes.

In various embodiments, one or more additives are introduced onto the silica fibers during the electrospinning process. For example, a slurry containing the material (e.g., in powder or particulate form) may be sprayed or misted onto the fibers between the spinnerets and the drum or as formed on the drum itself. In various embodiments, the slum contains one or more additives selected for the desired region of the fuel cell in solution with a carrier such as water and/or an organic liquid such as propylene carbonate. Fuel cells in accordance with embodiments of the invention may also incorporate one or more regions or sheets of the spun silica fibers (or powder produced therefrom) without the additive (s).

In various embodiments, the additive may be added into the sol-gel, for example in particulate or powder form, or as a slurry or mixture, prior to spinning of the silica fibers, and the as-spun fibers will incorporate the additive therein or thereon. In various embodiments, the additive is added into the sol-gel after at least a portion of the ripening time.

In other embodiments, the additive is incorporated onto the silica fibers and/or powder after the fibers or fiber mats are spun. After completion of the electrospinning process, the resulting mat is removed from the drum. For example, the mat may be cut and peeled away from the drum in one or more pieces. The mat may be cut to size, if desired or necessary, and the electrospun mat of silica fibers may be coated with one or more additives to form a region of the fuel cell. For example, the additive may be deposited over the silica fibers via techniques such as electrodeposition from a solution containing the additive, atomic layer deposition, chemical vapor deposition, or spraying or misting of a solution containing one or more additives selected for the desired region of the fuel cell along with a carrier such as water and/or a polymeric binder. In various embodiments, the silica fibers or mat is processed into silica fiber powder, and the additive is deposited on the powder (via, e.g., any of the above techniques) and/or mixed with the powder.

FIG. 1A is a schematic of a fuel cell in accordance with embodiments of the invention. As shown, the fuel cell includes an electrolyte flanked on either side by an anode and a cathode. Fuel (e.g., a hydrogen-based fuel such as hydrogen gas or a hydrogen-containing gas such as methane) flows along the anode, and air (or, in some embodiments, oxygen gas or another oxygen-containing gas) flows along the cathode. The fuel is oxidized at the anode, forming (1) protons that migrate through the electrode and (2) electrons that may be supplied to a load as electrical current. The oxygen is reduced at the cathode to form water that is conducted away from the cathode. Excess heat from the reaction is also transported away from the cathode. In various embodiments, the various regions or portions of the fuel cell are sealed within a housing containing the various inlets and outlets, and also one or more electrical connections for supplying electrical power to an external load. As described in more detail below, in various embodiments, the anode of the fuel cell may include, consist essentially of or consist of a catalyst layer and a diffusion layer, and/or the cathode of the fuel cell may include, consist essentially of, or consist of a catalyst layer and a diffusion layer. In other embodiments, the anode may include, consist essentially of, or consist of a single layer (which may correspond to a catalyst layer or a diffusion layer, as described herein), and/or the cathode may include, consist essentially of, or consist of a single layer (which may correspond to a catalyst layer or a diffusion layer, as described herein).

Figure 1B:
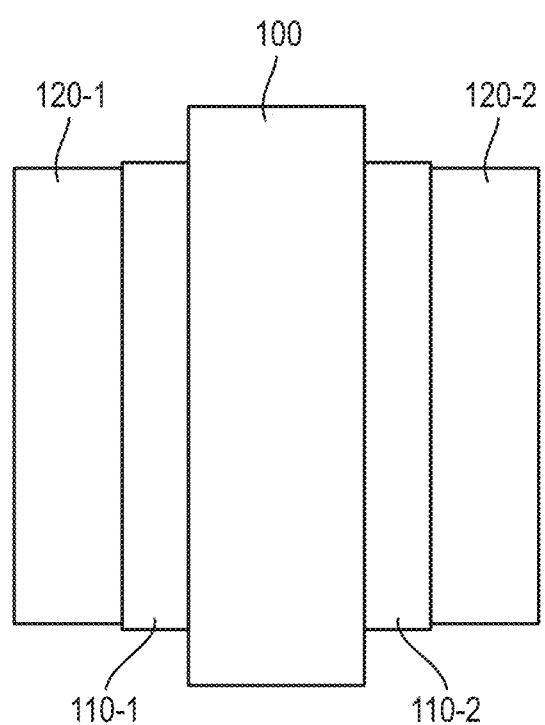
FIG. 1B is a cross-sectional schematic of portions of a fuel cell in accordance with embodiments of the present invention.
Figure 2A:
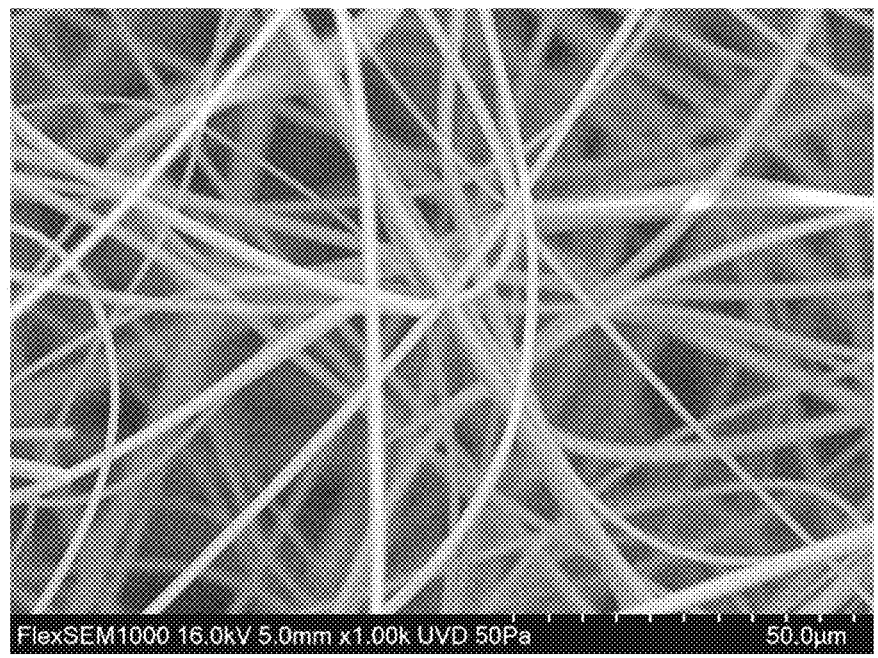
FIGS. 2A-2D are scanning electron microscopy (SEM) images of fibers spun in accordance with embodiments of the present invention. Images in FIGS. 2A-2D are at, respectively, 50, 100, 200, and 500 micron scale.
Figure 2B:
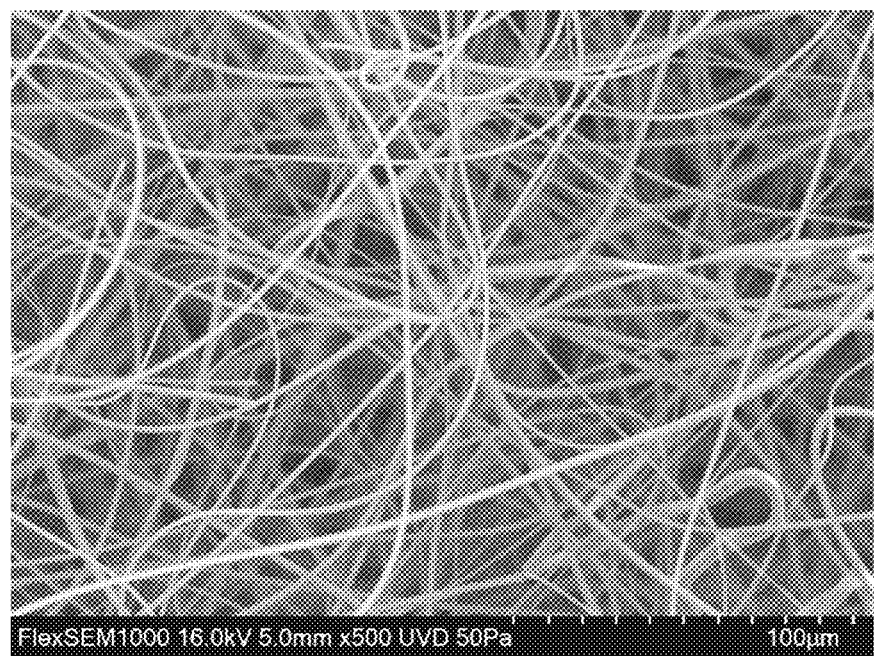
Figure 2C:
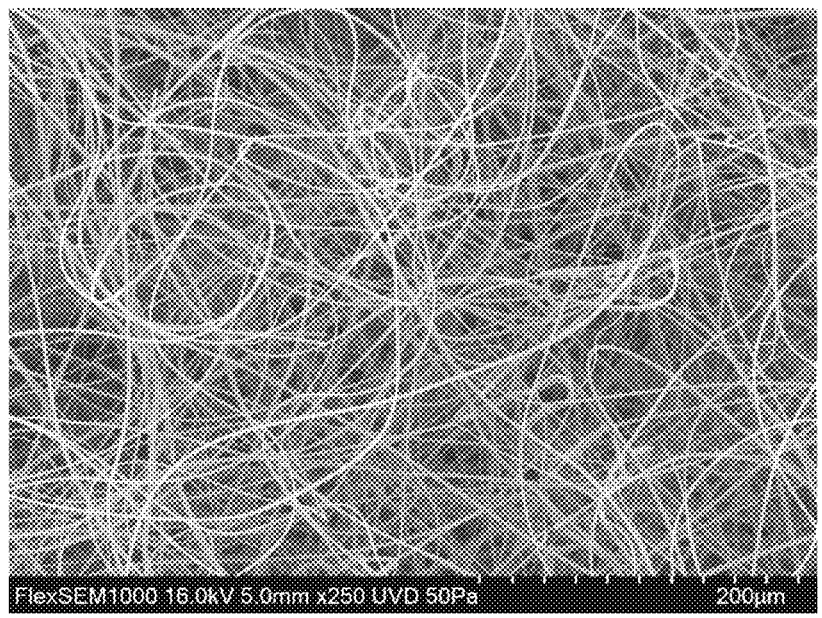
Figure 2D:
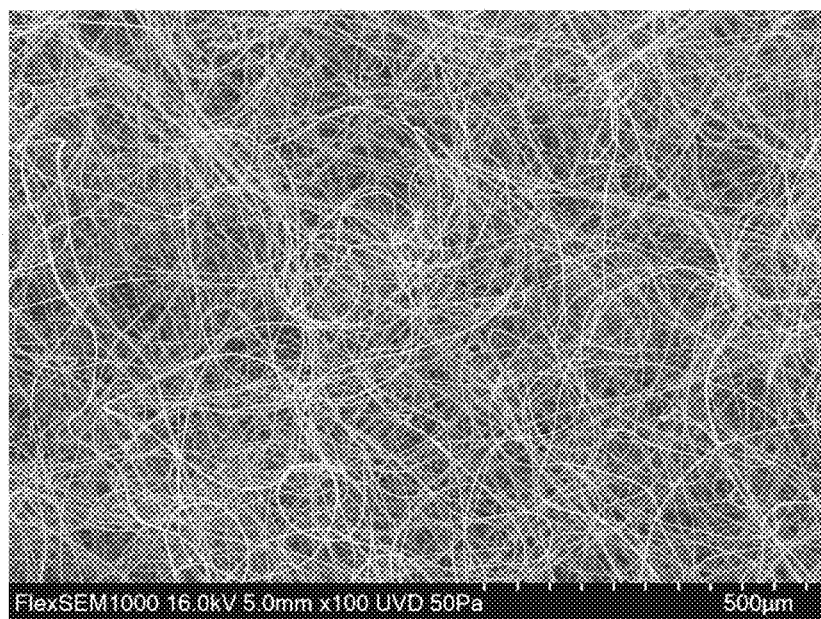

FIG. 1B is a more detailed schematic of portions of a fuel cell in accordance with embodiments of the present invention. As shown, an electrolyte layer 100 is flanked by an anode-side catalyst layer 110-1 and a cathode-side catalyst layer 110-2. Disposed outwardly from the catalyst layers are an anode-side diffusion layer 120-1 and a cathode-side diffusion layer 120-2. In general, the electrolyte layer 100 conducts protons therethrough but not electrons in order to prevent electrical shorting of the fuel cell. In addition, the electrolyte layer typically retards or substantially prevents flows of gas therethrough in order to prevent gas crossover. In various embodiments, the diffusion layers 120-1, 120-2 are omitted from the structure or (effectively) combined into the catalyst layers 110-1, 110-2, and the resulting structure may be considered to have an electrolyte layer flanked by an anode layer and a cathode layer, as shown in FIG. 1A.

In various embodiments, the electrolyte layer 100 includes, consists essentially of, or consists of a mat of silica fibers (e.g., a mat of silica fibers produced by, el ectrospinning as detailed herein). In various embodiments, the mat of silica fibers incorporates a functional electrolyte material to facilitate proton conduction. For example, the mat of silica fibers may incorporate liquid phosphoric acid ($H_3PO_4$) and/ or potassium hydroxide to form the electrolyte layer 100. In other embodiments, the electrolyte layer 100 does not include electrospun silica fibers; rather, the electrolyte includes, consists essentially of, or consists of one or more non-silica (e.g., polymer) membranes or layers. For example, the membrane may include, consist essentially of, or consist of a polymer or fluoropolymer, e.g., a sulfonated tetrafluoroethylene based fluoropolymer-copolymer such as NAFION, available from The Chemours Company of Wilmington, Delaware. In various embodiments, the membrane may include, consist essentially of, or consist of polybenzimidazole. During operation, the electrolyte layer 100 may incorporate water to facilitate proton conduction. In various embodiments, the thickness of the electrolyte layer 100 ranges from approximately 10 µm to approximately 200 µm. In various embodiments, the electrolyte layer 100 or a portion thereof (e.g., a non-silica membrane) is porous. For example; pores in the electrolyte layer 100 may range in size from approximately 5 nm to approximately 100 nm.

In various embodiments, electrolyte layers 100 may additionally incorporate one or more sheets of silica fibers in conjunction with one or more non-silica membranes. For example, a silica fiber sheet may be disposed between (and, e.g., in direct mechanical contact with) the electrolyte layer 100 and the anode-side catalyst layer 110-1, and/or a silica fiber sheet may be disposed between (and, e.g., in direct mechanical contact with) the electrolyte layer 100 and the cathode-side catalyst layer 110-2. In various embodiments, the electrolyte layer 100 includes, consists essentially of, or consists of a silica fiber sheet sandwiched between two non-silica membranes. In various embodiments, the incorporation of one or more sheets of silica fibers provides the electrolyte layer with protection from thermal decomposition and/or deformation, enhances mechanical integrity of the structure inside the fuel cell, and/or improves charge mobility within the fuel cell.

In various embodiments, electrolyte layers 100 may include, consist essentially of, or consist of one or more polymeric materials (e.g., one of the materials described above for non-silica membranes) with silica powder (e.g., fibrous fragments) incorporated therein and/or thereon. The silica powder itself may incorporate one or more additives or functional materials, or such materials may also be mixed within the matrix of the electrolyte layer (e.g., within the polymer material), In an embodiment, a silica fiber sheet of pressed silica fiber powder (e.g., fibrous fragments) may be sandwiched between two non-silica membranes, as mentioned above.

In various embodiments, for example those incorporating one or more silica fiber sheets with the electrolyte layer 100, the fuel cell may be substantially free of silica fibers and/or silica fiber powder within one or both catalyst layers 110-1, 110-2 and/or one or both diffusion layers 120-1, 120-2.

In various embodiments, one or both of the catalyst layers 110-1, 110-2 may include, consist essentially of, or consist of a mat of silica fibers incorporating (1) carbon or another electrically conductive material and/or (2) a catalyst material such as platinum (e.g., platinum particles). In various embodiments, the catalyst material (e.g., a catalyst material including, consisting essentially of, or consisting of one or more metals) may be sufficiently electrically conductive, obviating the need for an additional conductive material. In various embodiments, one or both of the catalyst layers may include a polymeric binder such as polytetrafluoroethylene (PTFE). In various embodiments, one or both of the catalyst layers may incorporate a sheet of silica fibers and/or silica powder (e.g., fibrous fragments) mixed with and/or incorporating the electrically conductive additive and the catalyst additive and such layers may be mixed with one or more polymeric binders.

In other embodiments, particularly embodiments in which the electrode includes silica fibers and/or silica powder, the catalyst layers may not include silica fibers; rather, the catalyst layers may include carbon (e.g., carbon paper (i.e., a flat sheet of carbon fibers) or other carbon-based support material) and a catalyst material such as platinum (e.g., platinum particles) incorporated therein and/or thereon. In various embodiments, each of the catalyst layers has a thickness ranging from approximately 5 µm to approximately 50 µm, e.g., approximately 10 µm to approximately 20 µm. In various embodiments, such catalyst layers may also include a sheet of silica fibers on one or both sides of the layer (i.e., between, and in direct contact with, the catalyst layer and the electrolyte layer, and/or the catalyst layer and the diffusion layer).

In various embodiments, the diffusion layers 120-1, 120-2 may be omitted, and the catalyst layers 110-1, 110-2 may be considered to be "anode" and "cathode" layers as shown in FIG. 1A. For example, in an embodiment, one or both of the anode layer 110-1 and the cathode layer 110-2 may include, consist essentially of, or consist of a sheet of silica fibers having a catalyst material (and/or an electrically conductive material such as carbon) incorporated therein and/or thereon. In an embodiment, the electrolyte layer 100 may include, consist essentially of, or consist of a sheet of silica fibers having no additive material incorporated therein or thereon. For example, the electrolyte layer 100 may include, consist essentially of, or consist of a sheet of silica fibers sandwiched between two non-silica membranes, as described above.

In various embodiments, the diffusion layers 120-1, 120-2, when present, may include, consist essentially of, or consist of a mat of silica fibers incorporating carbon or another electrically conductive material. Desirably, the diffusion layers are electrically conductive and porous to enable gas flow therethrough. In various embodiments, the diffusion layers may incorporate approximately 10% to approximately 40% PTFE or other fluoropolymer such as NATION. For example, one or both diffusion layers may incorporate a polymeric binder material.

In various embodiments, the diffusion layers 120-1, 120-2 may include, consist essentially of, or consist of one or more polymeric materials with silica powder (e.g., fibrous fragments) incorporated therein and/or thereon. The silica powder itself may incorporate one or more additives or functional materials, or such materials may also be mixed within the matrix of the diffusion layer (e.g., within the polymer material).

In various embodiments, one or both of the diffusion layers may incorporate a sheet of silica fibers and/or silica powder (e.g., fibrous fragments) mixed with and/or incorporating the electrically conductive additive and such layers may be mixed with one or more polymeric binders.

In other embodiments, particularly embodiments in which the electrode includes silica fibers, the diffusion layers may not include silica fibers rather, the catalyst layers may include, consist essentially of, or consist of carbon (e.g., carbon paper or other carbon-based support material). In various embodiments, each of the diffusion layers has a thickness ranging from approximately 10 µm to approximately 100 µm, e.g., approximately 15 µm to approximately 50 µm. In various embodiments, such diffusion layers may also include a sheet of silica fibers on one or both sides of the layer (i.e., between, and in direct contact with, the catalyst layer and the diffusion layer, and/or on the surface of the diffusion layer facing away from the catalyst layer).

Once assembled, the fuel cell may be placed in a housing featuring connections to the anode and cathode in order to provide for powering external loads, as well as inlets and outlets for fuel, air, and/or water, as shown in FIG. 1A.

EXAMPLES

Example 1: Preparation of Silica Fiber Mat

Silica fibers were prepared using an electrospinning process, in which a sol-gel was spun onto a collector drum to form a non-woven mat of fibers. The sol-gel was made in two parts. First, TEOS was mixed with ethanol, and then a second mixture containing HCl, water, and ethanol was titrated into the mixture. The sol-gel was then allowed to ripen for a few days under controlled conditions before spinning.

In one example, the first sol was made by weighing out 384 grams of TEOS 98% and 41.8 grams of anhydrous denatured ethanol, and pouring together. The first sol was allowed to let stand in a beaker, and a magnetic stirrer was used to create a homogenous solution. The second sol was made by weighing 41.8 grams of anhydrous denatured ethanol, 16.4 grams of distilled water, and 0.34 grams of hydrochloric acid, which was then poured together and mixed for 8 seconds with a magnetic stirrer until a homogenous second sol was formed.

The second sol was then poured into the titration device, which was placed above a beaker containing the first sol. The titration device then dripped about 5 drops per second until a third sol was formed via the mixing of the first sol and the second sol. During the dripping process, the first sol was continuously mixed with a magnetic stirrer while the second sol was dripped into the first sol.

The combined third sol was then placed into an enclosure box, A low pressure vacuum was provided by a fan on medium speed to remove fumes. The air temperature within the box was 72° F. with 60% humidity. The third sol was allowed to sit and process for about three days. The mixtures were agitated daily to reduce the build-up of crystalline structures. The third sol began to transition to sol-gel with evaporation of the alcohol solvent. Sol-gel may be monitored to determine an approximate amount of $C_2H_4$ (ethylene) in the vapors, which may be in the range of about 10-20% relative to that of the original sol before ripening. Upon proper gelatinization, the sol-gel was loaded into electrospinning machine or was frozen to preserve for electrospinning. In this example, proper gelatinization occurred when the total mass of the sol-gel was between about 70 grams and about 140 grams. This example may be scaled appropriately and the ranges may vary, yet still produce desirable structures. To further identify the ideal time to electrospin, portions of the gel may be dripped into the electric field of the spinning apparatus to evaluate the spinning properties of the sol-gel.

Figure 3:
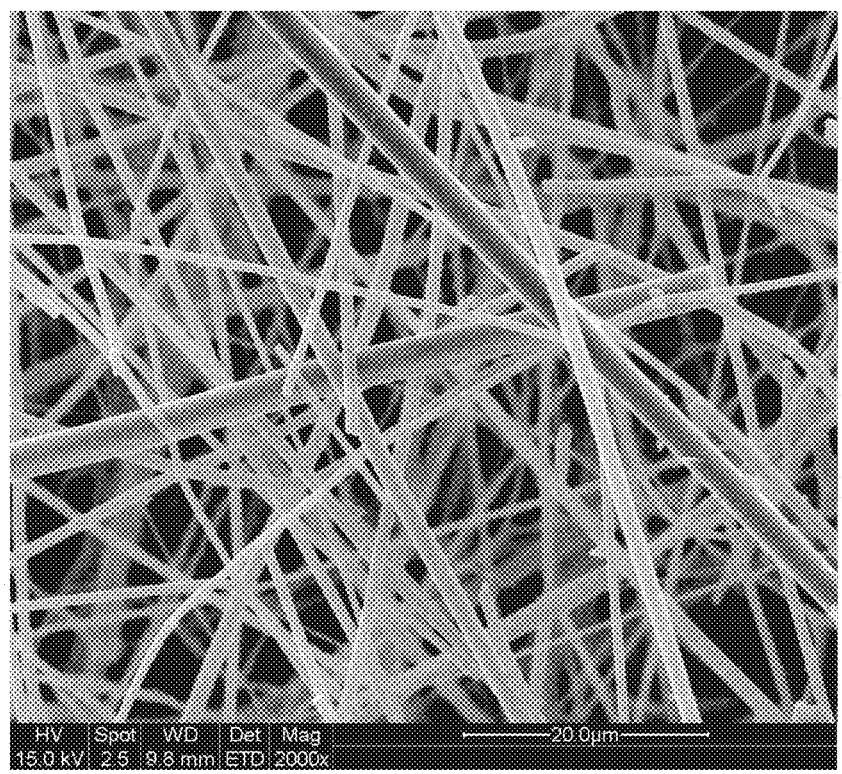
FIG. 3 shows an SEM image (20 micron scale is shown) of fibers spun in accordance with embodiments of the present invention after less ripening time than the figures shown in FIGS. 2A-2D.
Figure 4:
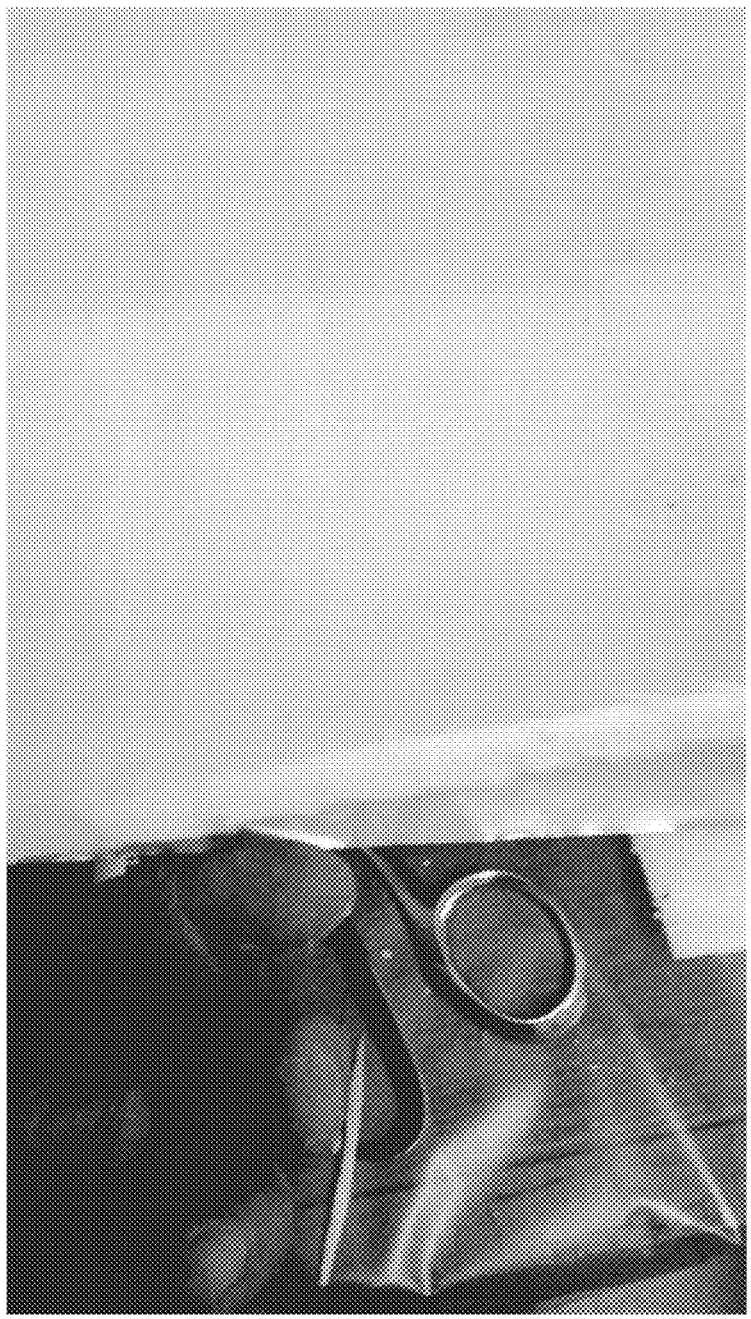
FIG. 4 shows a fiber mat spun with a thickness of about ¼ inch in accordance with embodiments of the present invention.

FIGS. 2A-2D are scanning electron microscopy (SEM) images of fibers spun in accordance with embodiments of the invention (50, 100, 200, and 500 micron scales shown). As shown, the fibers are flexible, smooth, dense, and continuous (not significantly fractured). FIG. 3 is an SEM image of fibers that were electrospun after less ripening time (20 micron scale shown), where the fibers are clearly rigid with many fractures clearly evident. Such fibers, in various embodiments, may be more brittle and more easily processed into silica fiber powder. FIG. 4 shows a fiber mat spun in accordance with embodiments of the invention. The flexibility and continuity of the fibers allows mats to be spun at a thickness of ¼ inch or more. The mat has a soft, flexible texture.

Figure 5A:
FIGS. 5A and 5B compare a silica fiber mat that was electrospun after a longer transitioning time in accordance with embodiments of the present invention 5A), with a fiber mat electospun after a shorter transition time in accordance with other embodiments of the present invention (FIG. 5B).
Figure 5B:

FIGS. 5A and 5B are images depicting the variation of properties of silica fiber mats as a function of ripening time. The mat of FIG. 5A is illustrative of mats electrospun for at least 2-3 days in accordance with embodiments of the invention, while the mat of FIG. 5B is illustrative of mats electrospun after less ripening time. The material in FIG. 5A has a soft texture and is very flexible; such material may still be processed into fiber dust or used in sheet form. The material in FIG. 5B is brittle, inflexible, and thin, and may be easily processed into fiber dust.

Figure 6A:
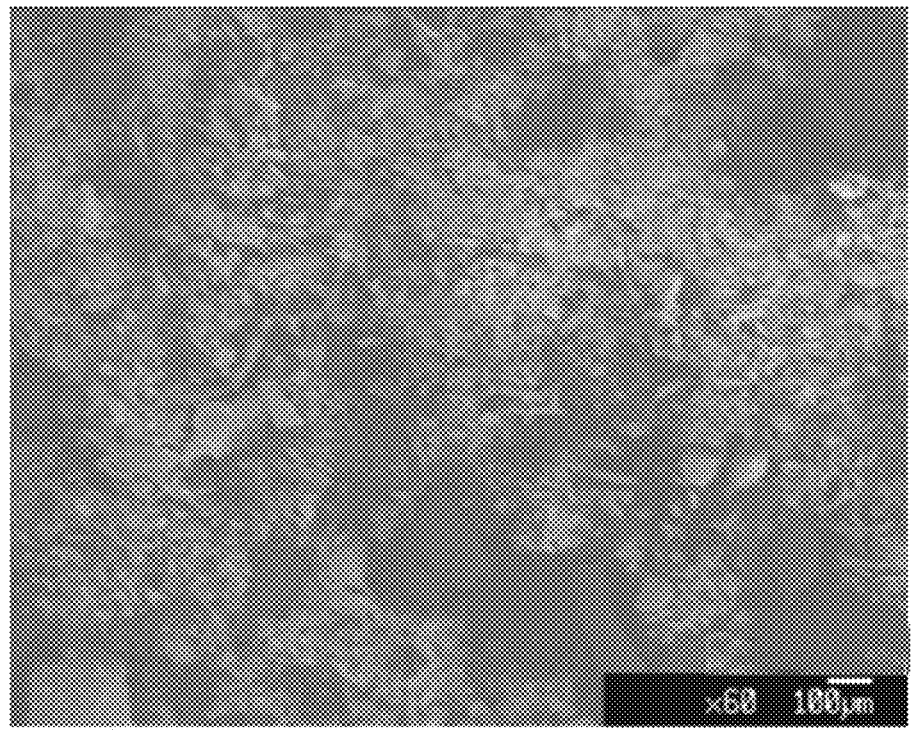
FIGS. 6A and 6B show SEM images of fiber dust in accordance with embodiments of the invention, with 100 μm scale shown.
Figure 6B:
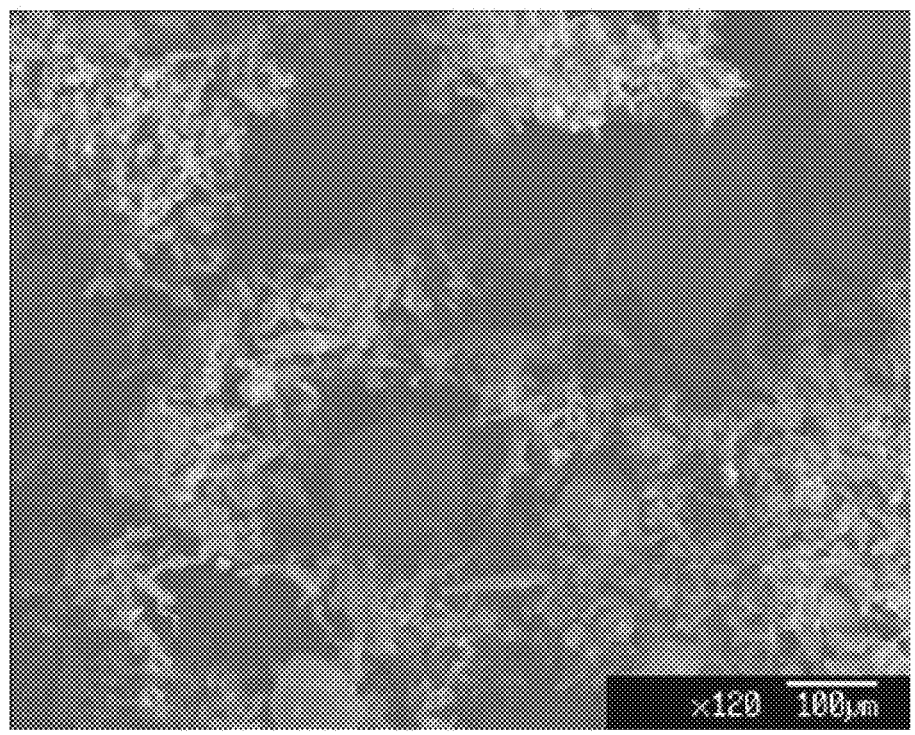

A silica fiber mat was fabricated and broken into fragments by rubbing through a series of screens of decreasing mesh size. The final screen was a 200 mesh screen, resulting in fiber dust and/or fibrous fragments having sizes of approximately 20 μm to approximately 200 μm. FIGS. 6A and 6B show SEM images of the resulting fiber dust, with 100 μm scale shown.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

The invention claimed is:

1. A method of fabricating a fuel cell, the method comprising:
   providing an electrolyte layer;
   providing a first catalyst layer being configured to receive a hydrogen-containing fuel, oxidize hydrogen from the fuel, and supply protons to the electrolyte layer;
   providing a second catalyst layer being configured to receive protons from the electrolyte layer, receive oxygen, and reduce the oxygen to form water to thereby enable the production of electrical current by the fuel cell;
   disposing the first catalyst layer on an anode side of the electrolyte layer;
   disposing the second catalyst layer on a cathode side of the electrolyte layer; and
   (A) disposing a first diffusion layer on the first catalyst layer opposite the electrolyte layer, the first diffusion layer being configured to transport the hydrogen-containing fuel to the first catalyst layer, and the first diffusion layer comprising a first sheet of silica fibers, the first diffusion layer being provided at least in part by (i) producing a first sol-gel from an initial sol containing 75% to 90% tetraethylorthosilicate (TEOS), 8% to 25% ethanol, an acid catalyst, and the balance water, and (ii) electrospinning the first sol-gel, and/or (B) disposing a second diffusion layer on the second catalyst layer opposite the electrolyte layer, the second diffusion layer being configured to transport oxygen to the second catalyst layer, and the second diffusion layer comprising a second sheet of silica fibers, the second diffusion layer being provided at least in part by (i) producing a second sol-gel from an initial sol containing 75% to 90% TEOS, 8% to 25% ethanol, an acid catalyst, and the balance water, and (ii) electrospinning the second sol-gel.

2. The method of claim 1, wherein at least one of the first catalyst layer or the second catalyst layer incorporates a catalyst material.

3. The method of claim 2, wherein the catalyst material comprises at least one of platinum, one or more platinum-group metals, nickel, ruthenium, palladium, cerium oxide, or an alloy of platinum with one or more other metals.

4. The method of claim 1, wherein the electrolyte layer comprises a fluoropolymer, potassium hydroxide, and/or phosphoric acid.

5. The method of claim 1, wherein the electrolyte layer comprises a non-silica membrane.

6. The method of claim 1, wherein the electrolyte layer is free of silica fibers.

7. The method of claim 6, wherein the first catalyst layer and the second catalyst layer are free of silica fibers.

8. The method of claim 1, wherein the first catalyst layer and the second catalyst layer are free of silica fibers.

9. The method of claim 1, wherein producing the first sol-gel and/or the second sol-gel comprises ripening the initial sol for at least 2 days at a humidity of 40% to 80% and a temperature of 50° F. to 90° F.

10. The method of claim 9, wherein the initial sol is ripened for at least 3 days.

11. The method of claim 9, wherein the sol-gel is electrospun when the weight of the sol-gel ranges from 10% to 60% of a starting weight of the initial sol prior to ripening.

12. The method of claim 9, wherein the sol-gel is electrospun when production of ethylene vapor therefrom ranges from 10% to 40% relative to the initial sol prior to ripening.

13. The method of claim 1, wherein the first diffusion layer is disposed on the first catalyst layer opposite the electrolyte layer.

14. The method of claim 13, wherein the second diffusion layer is disposed on the second catalyst layer opposite the electrolyte layer.

15. The method of claim 1, wherein the second diffusion layer is disposed on the second catalyst layer opposite the electrolyte layer.

16. A method of fabricating a fuel cell, the method comprising:
providing an electrolyte layer;
providing a first catalyst layer being configured to receive a hydrogen-containing fuel, oxidize hydrogen from the fuel, and supply protons to the electrolyte layer;
providing a second catalyst layer being configured to receive protons from the electrolyte layer, receive oxygen, and reduce the oxygen to form water to thereby enable the production of electrical current by the fuel cell;
disposing the first catalyst layer on an anode side of the electrolyte layer;
disposing the second catalyst layer on a cathode side of the electrolyte layer; and
(A) disposing a first diffusion layer on the first catalyst layer opposite the electrolyte layer, the first diffusion layer being configured to transport the hydrogen-containing fuel to the first catalyst layer, and the first diffusion layer comprising a first sheet of silica fibers, the first diffusion layer being provided at least in part by (i) electrospinning a first sol-gel to form a mat of silica fibers, (ii) fragmenting at least a portion of the mat into a powder, and (iii) pressing the powder to form the first sheet of silica fibers, and/or (B) disposing a second diffusion layer on the second catalyst layer opposite the electrolyte layer, the second diffusion layer being configured to transport oxygen to the second catalyst layer, and the second diffusion layer comprising a second sheet of silica fibers, the second diffusion layer being provided at least in part by (i) electrospinning a second sol-gel to form a mat of silica fibers, (ii) fragmenting at least a portion of the mat into a powder, and (iii) pressing the powder to form the second sheet of silica fibers.

17. The method of claim 16, wherein at least one of the first catalyst layer or the second catalyst layer incorporates a catalyst material.

18. The method of claim 17, wherein the catalyst material comprises at least one of platinum, one or more platinum-group metals, nickel, ruthenium, palladium, cerium oxide, or an alloy of platinum with one or more other metals.

19. The method of claim 16, wherein the electrolyte layer comprises a fluoropolymer, potassium hydroxide, and/or phosphoric acid.

20. The method of claim 16, wherein the electrolyte layer comprises a non-silica membrane.

21. The method of claim 16, wherein producing the first sol-gel and/or the second sol-gel comprises ripening an initial sol, the initial sol comprising tetraethylorthosilicate (TEOS), for at least 2 days at a humidity of 40% to 80% and a temperature of 50° F. to 90° F.

22. The method of claim 21, wherein the initial sol is ripened for at least 3 days.

23. A fuel cell fabricated according to claim 1.

* * * * *